United States Patent
Bindhammer

(10) Patent No.: US 11,224,162 B2
(45) Date of Patent: Jan. 18, 2022

(54) STRING REEL FOR A STRING TRIMMER, AND STRING TRIMMER CUTTING HEAD EQUIPPED WITH SUCH A STRING REEL OR IN THE FORM OF SUCH A STRING REEL

(71) Applicant: Scheppach Fabrikation von Holzbearbeitungsmaschinen GmbH, Ichenhausen (DE)

(72) Inventor: Markus Bindhammer, Friedberg (DE)

(73) Assignee: Scheppach Fabrikation von, Ichenhausen (DE)

( * ) Notice: Subject to any disclaimer, the term of this patent is extended or adjusted under 35 U.S.C. 154(b) by 165 days.

(21) Appl. No.: 16/488,980

(22) PCT Filed: Aug. 9, 2017

(86) PCT No.: PCT/EP2017/025229
§ 371 (c)(1),
(2) Date: Aug. 27, 2019

(87) PCT Pub. No.: WO2018/153424
PCT Pub. Date: Aug. 30, 2018

(65) Prior Publication Data
US 2019/0373808 A1    Dec. 12, 2019

(30) Foreign Application Priority Data
Feb. 27, 2017    (DE) ............... 20 2017 001 013.5

(51) Int. Cl.
*A01D 34/416*    (2006.01)

(52) U.S. Cl.
CPC ............... *A01D 34/4168* (2013.01)

(58) Field of Classification Search
CPC ....................... A01D 34/4161–4168
See application file for complete search history.

(56) References Cited

U.S. PATENT DOCUMENTS

| | | | |
|---|---|---|---|
| 10,470,367 B2 * | 11/2019 | Eiserer | A01D 34/416 |
| 2007/0028459 A1 | 2/2007 | Thomson | |
| 2013/0133208 A1 | 5/2013 | Skinner | |
| 2018/0110182 A1 * | 4/2018 | Nolin | A01D 34/4166 |

FOREIGN PATENT DOCUMENTS

| | | |
|---|---|---|
| CN | 103 430 688 A | 11/2013 |
| DE | 30 29 056 A1 | 2/1982 |
| EP | 0 876 750 A1 | 11/1998 |

* cited by examiner

*Primary Examiner* — Omar Flores Sanchez
(74) *Attorney, Agent, or Firm* — The Dobrusin Law Firm, PC

(57) ABSTRACT

A string reel (1) for being mounted on a cutting head of a string trimmer in a rotatable manner in mowing operation. The string reel (1) is constructed as an exchangeable wearing part, onto which a number of mowing string strands (2) is wound up, for example two mowing string strands (2), so that in mowing operation each free thread end is pulled radially outwards by centrifugal force and the piece of thread pulled outwards by the rotary movement in mowing operation and located at the free thread end can knock off plant stalks. The mowing string strands (2) have a greater length than the respective thread piece pulled outwards in mowing operation at the free thread end, so that the number of mowing string strands (2) can be pulled out at the free thread end after wear of the thread piece.

12 Claims, 1 Drawing Sheet

Figure 1:
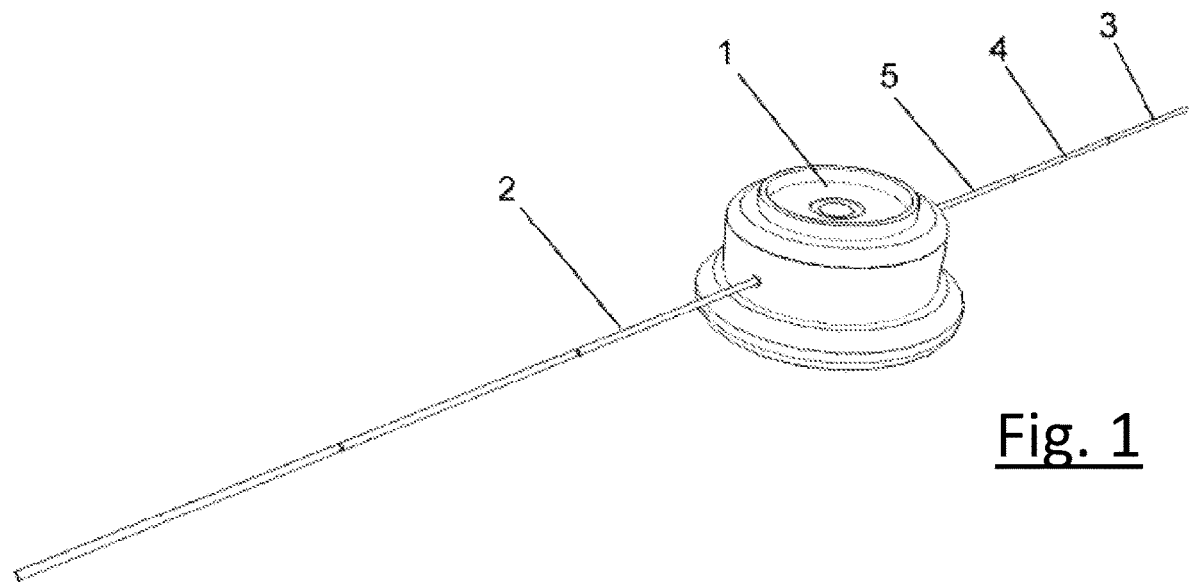

STRING REEL FOR A STRING TRIMMER, AND STRING TRIMMER CUTTING HEAD EQUIPPED WITH SUCH A STRING REEL OR IN THE FORM OF SUCH A STRING REEL

The invention concerns a string reel to be attached to a cutting head of a string trimmer in accordance with the preamble of claim 1, which can be moved during mowing, further a cutting head of the string trimmer equipped with such a string reel and a cutting head of the string trimmer designed as such a string reel.

String trimmers of the generic type are used for trimming grass pieces that are difficult to reach, but also undergrowth and the like, whereby powerful, petrol-driven string trimmers and in the segment of electric scytheses, lawn trimmers and brush cutters with a slightly lower performance fall under the generic term string trimmers.

Such string trimmers are usually equipped with string reels at the cutting head, wherein the cutting tool is formed by a thread which is wound onto a reel or spool and, when the spool is rotated by the motor, is pulled radially outwards at its free ends protruding from the spool by centrifugal force. Such mowing threads or strings are usually made of plastic and wear relatively quickly during mowing, which is why considerably more thread is picked up on the generic string reels than protrudes from the string reel as a cutting tool. If the piece of thread serving as a cutting tool is worn out, simply draw another piece of thread, which then serves as a new cutting tool, until it is also worn out and the next piece of thread is drawn and so on. Such mow thread bobbins or string reels usually have two thread strands, the two free ends of which are guided out of the cutting head housing offset by 180°. The length of the mowing thread, for example, can be between two and four metres.

There are string trimmer cutting heads which have a multi-part housing in which a string reel which can be replaced as a wearing part is accommodated. When the mower thread is finished, the housing is opened and the old string reel is removed and replaced with a new one. Other cutting heads are designed to form as a whole the string reel and represent as a whole the wear part.

A common problem here is that it is not easy to determine which mower thread length is still available. In the case of a multi-part housing in which the reel is accommodated, the housing must first be dismantled in order to get to the reel and then to see how much thread is still there. This is not possible with a cutting head that cannot be dismantled and is designed to form as a whole the string reel. Often, however, you do not have a spare string reel at hand for trimming or brush-cutting work or the like, so that the work has to be interrupted and a new string reel has to be ordered or bought before you can continue working.

According to European patent application EP 0 876 750 A1 or German patent application DE 197 19 489 A1, a string reel for rotatable attachment to a cutting head of a string trimmer is proposed, wherein two mow string strands are wound onto the string reel, the free ends thereof are drawn outwards during mowing by centrifugal force, and wherein the mow string strands can be pulled out after wear of the string pieces or thread pieces at the free ends, in order to provide a length of the string pieces necessary for mowing. Therein, a reserve section of the string is dyed different to the rest of the mowing string, in order to provide a visual signal signalling that only a certain rest string length is available.

Starting from there, it is an object of the present invention to improve the signalling, that only a certain rest length of the mowing string is available, at string reels or at cutting heads of string trimmers.

This object is solved with regard to the string reel with the features of claim 1. The invention is concerned with a string reel (1) for being mounted on a cutting head of a string trimmer in a rotatable manner in mowing operation. The string reel (1) is constructed as an exchangeable wearing part, onto which a number of mowing string strands (2) is wound up, for example two mowing string strands (2), so that in mowing operation each free thread end is pulled radially outwards by centrifugal force and the piece of thread pulled outwards by the rotary movement in mowing operation and located at the free thread end can knock off plant stalks. The mowing string strands (2) have a greater length than the respective thread piece pulled outwards in mowing operation at the free thread end, so that the number of mowing string strands (2) can be pulled out at the free thread end after wear of the thread piece. At least one of the number of mowing string strands (2) has a different appearance in a normal consumption section (3) extending starting from the free end of the respective mowing string strand than in a reserve section (5) which can only subsequently be pulled out and is located closer to the connection point to the string reel (1), wherein the at least one of the number of mowing string strands (2) in a warning section (4) situated between its normal consumption section (3) and its reserve section (5) has a different appearance than in its normal consumption section (3) and in its reserve section (5).

In accordance with the invention, a string reel is proposed for mounting on a cutting head of a string trimmer, in particular a lawn trimmer or a brush cutter, so that it can rotate during mowing, the string reel being designed as an exchangeable wearing part. In this context, rotary attachment to a cutting head on a string trimmer, wherein the string reel is formed as an exchangeable wear part, means that the string reel can be attached to a frame, housing or the like of the cutting head and forms the cutting head together therewith, or that the string reel forms the cutting head as a whole, for example in one piece with the corresponding housing. A number, preferably two mower string strands or mower thread strands, is wound onto the string reel so that each free thread end is pulled radially outwards by centrifugal force during mowing operation and that the thread piece tightened during mowing operation and located close to the respective thread end can knock off plant stalks. Therein, each mowing thread strand has a greater length than the respective thread piece at the thread end which is pulled outwards in mowing operation, so that each mowing thread strand can be pulled out after wear of the thread piece at the thread end in order to extend a mowing duration achievable with the string reel. At the string reel in accordance with the invention, at least one, preferably each of the number of mowing string strands in a normal consumption section extending from the free end of the respective mowing string strand has a different appearance than in a reserve section which can only be pulled out afterwards and is located closer to the point of connection to the string reel. According to the invention, a further warning section may be provided between the reserve section and the normal consumption section as an advance warning that the reserve section will soon be reached, in which the mower string again has a different appearance than in its reserve section and in its normal consumption section. This gives the user an indication when the end of the service life of the string reel is approaching and can then procure supplies before the string reel needs to be replaced. Annoying downtimes can then be eliminated.

Advantageous further developments are subject of subclaims. Thus, the reserve section may extend from the point of attachment to the string reel towards the free end, in other words, it may be located entirely at the point of attachment end of the respective mower string.

A variation of the appearance, i.e. the visual appearance of the mower string strand that can be perceived by the user, is achieved particularly simply by colour marking, i.e. when the sections of the respective mower string strand vary in colour.

The reserve section of the mowing thread can be dyed. Preferably it has a warning colour, especially red. Furthermore, the colouring is so intense that it can also be perceived during operation of the string trimmer. Furthermore, the normal consumption section is also preferably coloured, namely advantageously in a colour which strongly stands out from the colouring in the warning section, in particular green, which is located on the other side of the colour circle like red, so that reaching the reserve section is clearly perceptible due to the strong contrast. The warning section can be colored in an intermediate color, for example yellow or orange, so that a kind of "traffic light" results.

Figure 2:
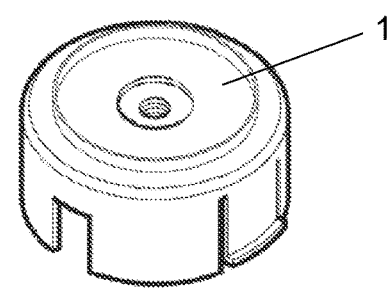
Figure 2:
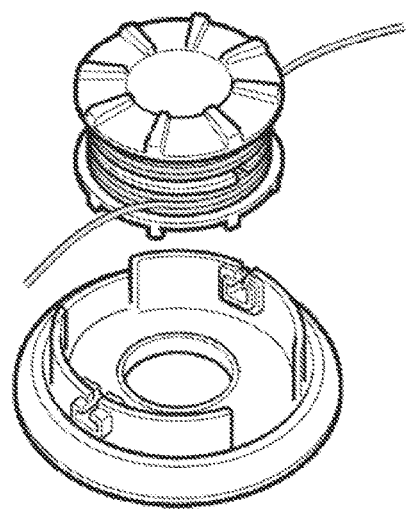

In the following, embodiments of the invention are explained in more detail using the attached drawings. FIG. 1 shows a perspective view of a string reel 1 accommodated in a cutting head housing with mowing string strands 2 completely unwound and guided through a thread opening in a circumferential wall of the cutting head housing by 180° offset to each other to illustrate the invention. The mowing string strands 2 each have a red coloured reserve section 5, an orange coloured warning section 4 and a green coloured normal consumption section 3. FIG. 2 shows an exploded view of a string reel assembly having a cutting head housing being in two parts so that the string reel 1 is accessible for replacement.

If, after some time in mowing operation, the red coloured reserve section 5 is reached when the mower string strands 2 are pulled out, this signals that a spare string reel should be procured as soon as possible so that the end of the mower string is not reached during running mowing operation and no annoying downtime occurs. If the orange warning section 4 is reached before the reserve warning section 5 is reached, a corresponding warning is given before the actual reserve warning section 5 is reached.

For example, the two mower string lines 2 may be coloured green on the first meter forming the normal consumption section 3, orange on the second meter forming the warning section 4 and red on the last meter forming the reserve section 5.

Variations and modifications of the shown design are possible without leaving the scope of the invention.

The invention claimed is:

1. A string reel assembly having a string reel (1) for being mounted on a cutting head of a string trimmer in a rotatable manner in mowing operation, wherein
    the string reel (1) is constructed as an exchangeable wearing part, onto which a number of mowing string strands (2) is wound up, two mowing string strands (2), so that in mowing operation each free thread end is pulled radially outwards by a centrifugal force and a piece of thread pulled outwards by the rotary movement in mowing operation and located at the free thread end can knock off plant stalks, wherein
    the mowing string strands (2) have a greater length than the respective thread piece pulled outwards in mowing operation at the free thread end, so that the number of mowing string strands (2) can be pulled out at the free thread end after wear of the thread piece, wherein
    at least one of the number of mowing string strands (2) has a different appearance in a normal consumption section (3) extending starting from the free end of the respective mowing string strand than in a reserve section (5) which can only subsequently be pulled out and is located closer to a connection point to the string reel (1), wherein
    the at least one of the number of mowing string strands (2) in a warning section (4) situated between its normal consumption section (3) and its reserve section (5) has a different appearance than in its normal consumption section (3) and in its reserve section (5).

2. The string reel (1) according to claim 1, wherein each of the number of mowing string strands (2) has a different appearance in a normal consumption section (3) extending starting from the free end of the respective mowing string strand than in a reserve section (5) which can only subsequently be pulled out and is located closer to the connection point to the string reel (1), wherein each of the number of mowing string strands (2) in a warning section (4) situated between its normal consumption section (3) and its reserve section (5) has a different appearance than in its normal consumption section (3) and in its reserve section (5).

3. The string reel (1) according to claim 2, wherein the reserve section (5) extends in the direction of the free thread end starting from the connecting point to the string reel (1).

4. The string reel (1) according to claim 1, wherein the at least one of the number of mowing string strands (2) in its reserve section (5) varies in colour relative to its normal consumption section (3) and also relative to its warning section (4).

5. The string reel (1) according to claim 2, wherein each of the number of mowing string strands (2), in its reserve section (5), varies in colour relative to its normal consumption section (3) and also relative to its warning section (4).

6. The string reel (1) according to claim 5, wherein each of the number of mowing string strands (2) is dyed in its reserve section (5), in its warning section (4) and in its normal consumption section (3).

7. The string reel (1) according to 6, wherein the reserve portion (5) of each of the number of mower thread strands (2) is red.

8. The string reel (1) according to claim 7, wherein the normal consumption portion of each of the number of mower thread strands (2) is green.

9. The string reel (1) according to claim 8, wherein the warning portion (4) of each of the number of mower thread strands (2) is yellow or orange.

10. The string reel (1) according to claim 5, wherein the length of the reserve section (5) is less than or equal to the length of the normal consumption section (3).

11. The string reel (1) according to claim 10, wherein the length of the reserve section (5) is between 50 and 100 cm, the length of the warning section (4) is between 50 and 100 cm and each of the number of mowing string strands (2) is between 250 and 400 cm long, preferably 300 cm long.

12. The string reel assembly of claim 1 having a cutting head for a string trimmer having a housing and the string reel (1) contained therein, the housing being in several parts so that the string reel (1) is accessible for replacement, and the housing having in its peripheral wall at least one thread opening through which a respective mowing string strand (2) is guided.

* * * * *